Feb. 14, 1956 E. B. HAMMOND, JR 2,734,278
COMPENSATED GYROSCOPIC HORIZON
Filed Nov. 17, 1950 2 Sheets-Sheet 2

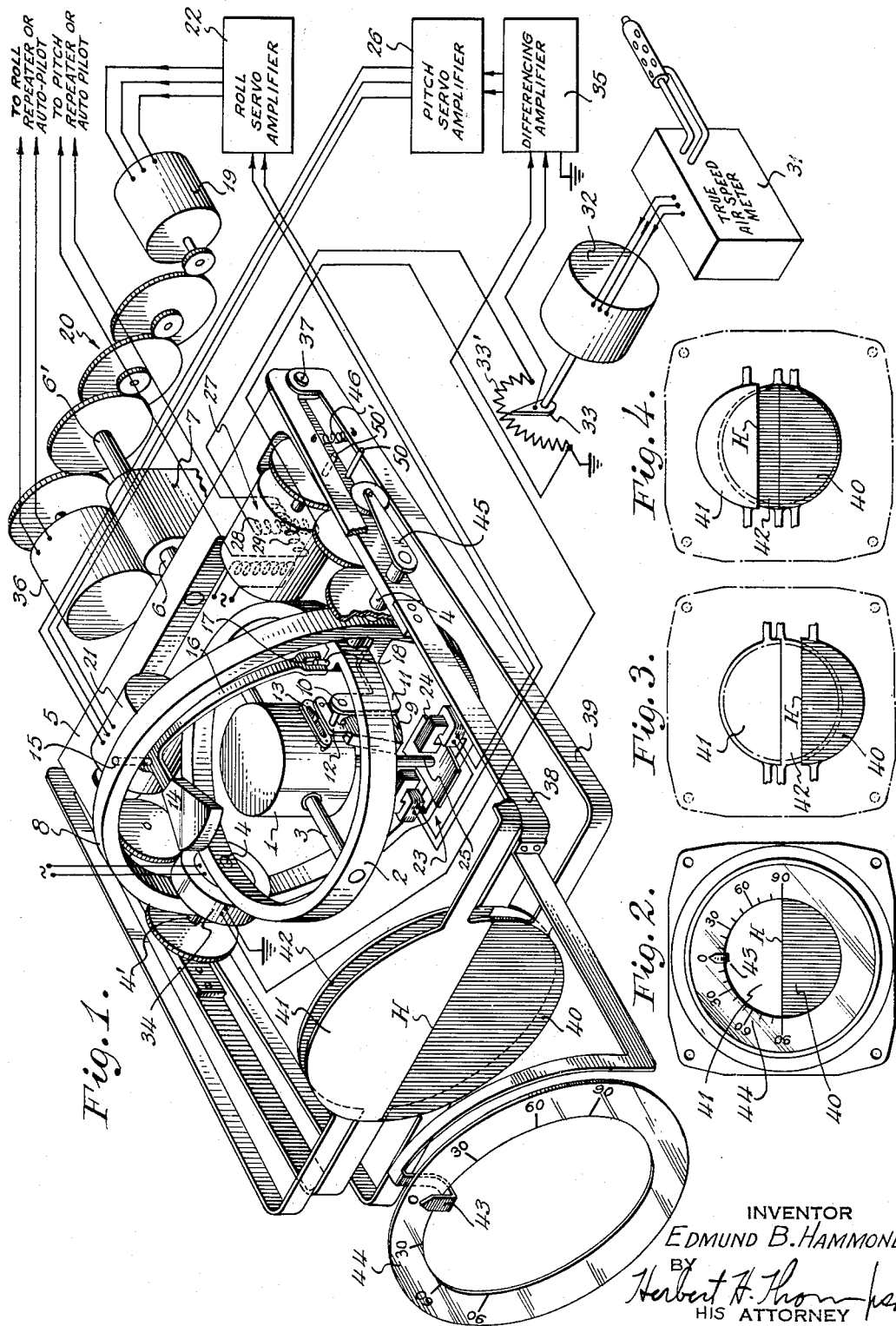

INVENTOR
EDMUND B. HAMMOND, JR.
BY
HIS ATTORNEY

United States Patent Office 2,734,278
Patented Feb. 14, 1956

2,734,278

COMPENSATED GYROSCOPIC HORIZON

Edmund B. Hammond, Jr., Merrick, N. Y., assignor to Sperry Rand Corporation, a corporation of Delaware Application November 17, 1950, Serial No. 196,315

9 Claims. (Cl. 33—204)

This invention relates to gyroscopic flight instruments designed to indicate the vertical or horizontal on rapidly moving craft, such as airplanes. In general, all gyroverticals now utilize some type of gravitationally controlled element such as a pendulous device for sensing the direction of gravity, the gyroscope being slaved or coerced in some manner to the element by a device which applies a torque on the gyro about a horizontal axis at right angles to the relative tilt of the gyro and pendulous element. Such instruments are, of course, subject to acceleration forces having a component in the horizontal plane as well as the vertical acceleration of gravity, the former being caused by both turns of the craft (centrifugal acceleration) and changes of speed (linear acceleration).

While it has been proposed to eliminate the control between the pendulums and gyroscope during turns, at least about the roll axis, and during changes of speed, such an arrangement is unsatisfactory for high speed aircraft, since the duration of acceleration due to either of the above causes is prolonged, resulting in the gyroscope being freed from control for long periods during which it is subject to uncontrolled and unpredictable wander, unless the gyro is also made pendulous, in which case acceleration errors from this cause reappear.

According to my invention, I propose to leave the erection device in operation about both axes at all times, but to introduce a correction such that the true vertical will be indicated by the instrument even during turns and marked changes of speed. This result was partially accomplished heretofore by forwardly slightly inclining the spin axis of the gyro-vertical at an angle such that the rate of precession of the gyro spin axis about the vertical during a turn is equal to the rate of turn of the craft.

According to my invention, I propose to not only avoid the errors due to turn, but also those due to linear acceleration by causing the angle of inclination of the gyro to vary with the air speed of the craft and it may be shown both experimentally and mathematically that by so varying such angle I not only prevent the turn error for all air speeds, but prevent linear acceleration errors.

According to the present invention, it is proposed not only to cure the turn error for all ordinary air speeds, but also to cure the change-of-speed error by one and the same means and in one and the same operation.

(1) The basic law governing the removal of the turn error in this type of gyro-vertical may be simply stated as follows:

$$\sin \alpha \propto \frac{KS}{\omega Mg}$$

where $\alpha$ = the angle of inclination of the gyro,
$K$ = the erecting torque gradient, that is, the ratio of the erecting torque to inclination,
$S$ = the speed of the craft,
$\omega$ = the rotor speed,
$M$ = its moment of inertia, and
$g$ = the acceleration of gravity.

Hence, for curing the turn error, $\omega$ may be varied directly with S, $\sin \alpha$ may be varied directly with S, or K may be varied inversely with S.

It may also be shown mathematically and experimentally that the change of speed error may also be cured simultaneously if such variations in $\omega$ or $\alpha$ be made simultaneously with and proportionally to the change of speed. In other words, the reaction on the gyroscope having a component about the fore-and-aft axis in accelerating or decelerating the rotor (or forcing a change in $\alpha$) applies a torque sufficient to oppose and prevent an oscillation being set up by the erection device due to the action of acceleration forces thereon at the time.

According to my invention, I provide means for providing an erection torque about each gyro axis substantially proportional to tilt and to the centrifugal and lateral accelerations as detected by the pendulum references and for changing the forward inclination of the gyro with changes of air speed. Preferably, this is done by shifting the relationship between the gravitational or pendulous controller and the gyroscope.

More particularly, my invention constitutes an improvement over the prior invention of John M. Slater, disclosed in his Patent No. 2,630,017, dated March 3, 1953 for Acceleration Corrections for Gyro-Verticals.

Referring to the drawings,

Fig. 1 is a perspective view and elementary wiring diagram showing my improved gyro-vertical and electrical control circuits used thereon;

Figs. 2, 3 and 4 are face views of a form of indicator dial adapted to be used on the gyro, Fig. 2 showing the position of the dials in level flight; Fig. 3 in climbing and Fig. 4 in diving.

Figure 5:
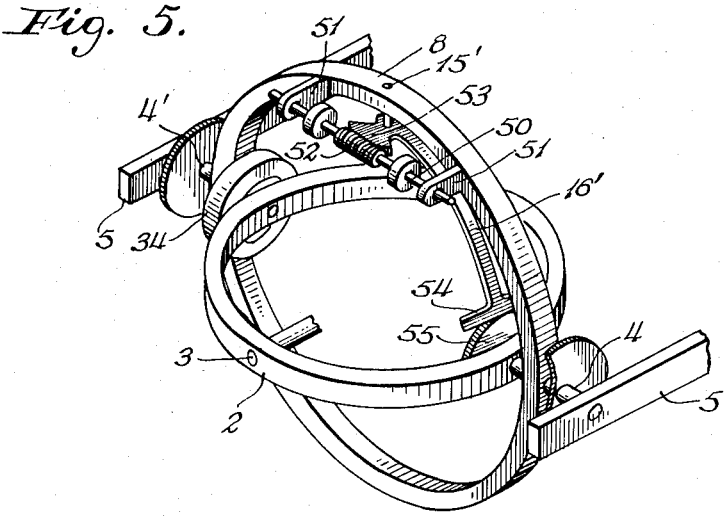
Fig. 5 is a perspective view showing a modification of Fig. 1.

The gyro-vertical represented in Fig. 1 comprises a gyroscope enclosed in a casing 1 and mounting the rotor (not shown) on a substantially vertical spin axis, the casing being pivoted in gimbal ring 2 on a substantially horizontal axis 3, which in this instance is shown as fore and aft on the craft. The gimbal ring 2 in turn is journaled athwartship on the craft on horizontal axis 4—4' within an outer follow-up gimbal ring 5 journaled for rotation about normally horizontal axis 6 in a main bearing 7. A follow-up vertical ring 8 is journaled in the gimbal 5 about transverse axis 4—4', so that the gyro and its gimbal support are within a mounting which follows the gyroscope about both axes.

A very simple means for applying gravitationally controlled erecting torques on the gyro at right angles to the tilt and proportional thereto is illustrated. This comprises two pendulums, one pendulum 9 being pivoted at 10 on a bracket 11 extending from follow-up ring 8. This pendulum is pivoted slightly to one side of the transverse axis 4—4' of the system and has a bell crank arm 12 extending therefrom with a pin 13 engaging a slot in the gyro case parallel with the axis 3—3. With this construction, tilt of the gyro about the gyro axis 4—4' will cause a similar tilt of the ring 8 (by the follow-up operation, as explained hereinafter), thereby revolving pivot 10 with respect to or about pin 13 and tilting pendulum 9 to thereby exert an erecting torque on the gyro about axis 3—3; in other words, at right angles to the tilt. Similarly, an acceleration force on pendulum 9 would also exert a torque about axis 3—3. It should be noted also that the action of the pendulum is primarily dependent on the ring 8 being maintained in a vertical plane. In other words, when the ring 8 becomes inclined about axis 4—4', the position of the pivot point 10 is revolved with respect to that of pin 13 and the pendulum thereby tilted to exert a torque on the gyro.

Similarly, for control of the gyro in roll, there is provided a pendulous eccentric mass 14 which is pivoted on a vertical pivot 15 on the vertical ring 8. This mass has a long curved arm 16 extending from pivot 15 down to a point near the ring 2 where it is forked at 17 and engages a short vertical pin 18 extending upwardly from ring 2. With this construction, it will be seen that no torque is exerted on the gyro as long as the ring 8 and its pivot 15 remain vertical, but that an inclination of the same about the lateral axis 3—3 will cause the mass to tend to fall toward the low side, thereby exerting a torque on the gyro about axis 4—4', thereby causing the ring 8 to straighten up through the follow-up system to be described. Centrifugal force on the mass 14 will also exert a torque on the gyro through pin and fork 17—18 about axis 4—4'.

For positioning the follow-up gimbal 5, I have shown a roll servo motor 19 gear through reduction gear train 20 to the fore-and-aft trunnion 6', and for positioning the follow-up vertical ring 8 from the gyro, I have shown a pitch servo motor 21 mounted on ring 5 and geared to the trunnion on axis 4—4'. The roll servomotor is controlled from a roll servo amplifier 22 actuated from a pick-off 23 or controller responsive to relative tilt of the gyro and its follow-up support about the roll axis 3. This is shown as in the form of a double U inductive device 23 mounted on the ring 8 and an iron armature 24 mounted on a downward extension 25 from the gyro case. The pitch servo motor 21 in turn is controlled primarily from pitch servo amplifier 26 from inductive pick-off 34 on the axis 4—4' acting between the horizontal ring 2 of the gyro and the follow-up vertical ring 8.

A very simple method for securing the proper forward tilt of the gyro for different air speeds to compensate for both turns and changes of speed, is to provide between the pitch servo 21 and its controlling pick-off 34 a variable means for causing the follow-up system, or more particularly, the follow-up ring 8, to initially tend to assume a rearwardly inclined position with respect to the gyro through an angle equal and opposite to the proper forward inclination $\alpha$ of the gyro for the prevailing air speed. In this manner, the pendulum would immediately cause the gyro to straighten up the vertical ring 8 to its true vertical thereby causing the gyro to be forwardly inclined at the proper angle, according to the following equation:

$$\sin \alpha \propto \frac{KS}{\omega Mg}$$

given hereinbefore.

A consideration of the problem, however, will show that the above relationship holds true only if the aircraft is flying level, that is, horizontally, since if the aircraft has a climb or dive component in its forward velocity, the air speed indicator will not give the true horizontal velocity of the craft, which is the factor causing horizontal acceleration forces on the pendulum 9 at right angles to gravity. Therefore, it is necessary to employ also the factor of $\cos \theta$ (where $\theta$ is the angle of climb or dive of the aircraft) to modify the air speed factor S. In order to secure the proper forward tilt, therefore, I have shown the follow-up motor 21 which rotates the vertical ring 8 about transverse axis 4—4' as controlled from a true air speed signal S as modified by a resolver type pick-off 34 acting between said ring and the gimbal ring 2 of the gyro, for introducing the aforesaid correction in tilt angle proportional to the horizontal component of air speed, i. e., $S \cos \theta$. The "S" factor is shown as secured from the true air speed meter 31 which positions through a servo system 32 a secondary controller such as the arm 33 of potentiometer 33'. The $\cos \theta$ factor may be secured from a winding 28 on a resolver unit 27 which may also be used to transmit the pitch angle indication to a repeater or automatic pilot from a second winding 29 thereon. Such resolver units are well known in the art, a more complex form being shown in the prior patent to Wittkuhns, No. 2,293,092, dated August 18, 1942 for Correction Device for Gyroscopes, see rotary transformer 65. Winding 28, it will be seen, gives its maximum or unit output when the craft is flying horizontally and an output decreasing with the cosine of the angle of dive or climb ($\cos \theta$). These two factors are multiplied and the product signal led into the differencing amplifier 35 into which the signal from pick-off 34 is also led. The resulting difference signal is fed into the pitch servo amplifier 26 actuating the pitch follow-up motor 21. Therefore, the vertical ring will tend to tilt backwardly with respect to the gyro through an angle proportioned to the horizontal component of the air speed of the craft, the vertical component being rejected by the resolver, with the result that the gyro will be tilted forwardly as explained hereinafter. Incidentally, it might be remarked that the $\cos \theta$ factor is vitally necessary if the aircraft is intended for acrobatics, since in case of a loop the gyro should be truly vertical when the craft is flying straight up or down and its inclination should be reversed when the airplane is on its back, all of which is accomplished by the $\cos \theta$ resolver.

The ring 8 and the gyro, therefore, will be truly vertical when the craft is stationary, due to follow-up servo 21 and its pick-off 34, but as it speeds up, the output of the true air speed potentiometer will unbalance the network and cause the ring 8 to tend to assume an inclination $\alpha$ essentially proportional to the horizontal component of air speed. The pendulum, however, will immediately cause the gyro to precess to an inclined position such that the vertical ring will be straightened up. Thus we have the gyro coerced into a forwardly inclined position at the proper angle to correct for both turns and accelerations at all air speeds and rates of turn and for all attitudes.

The true vertical is therefore indicated by the follow-up system, since it remains truly vertical and is unaffected by the inclination of the gyro. Therefore, I am able to actuate from the follow-up system a roll transmitter 36 and a pitch transmitter (resolver 27) in which the winding 29 may be used as the pitch angle transmitting winding.

If it is desired, visual indicators may be directly actuated from the follow-up system. For this purpose, I have shown as pivoted at 37 on the outer ring 5 a pair of U-shaped arms 38 and 39, the latter of which carries a semi-circular disc 40 preferably of dark color and the former of which carries a complementary semi-circular disc 41 of a light color. Behind the discs is a circular background or disc 42 secured to the follow-up ring 5, the upper portion of which is dark and the lower half light. There is also secured to the ring 5, a roll angle pointer 43 readable on a circular scale 44 around the face of the instrument. When the aircraft is level the face will appear as in Fig. 2, with the horizon line H horizontal and central. In this position, both arms are held against limit stops 50, 50' by spring 46. If, however, the airplane pitches upwardly, a crank 45 on the trunnion 4 of ring 8 will move downwardly away from pin 50 and rotate the arm 39 about pivot 37 downwardly against the action of spring 46, thus moving the darkened disc 40 downwardly which is the direction that the horizon line would appear to move if the craft were climbing. If the craft pitches downwardly, on the other hand, the upper disc 41 is raised away from pin 50' by upward movement of the bell crank 45 pressing against the arm 38 causing the horizon line H to move up. The rolling of the craft will, of course, cause the horizon line H to appear to roll in the opposite direction and also move the index 43 through the angle of bank.

A modification in the form of a roll responsive mass or gravitational controller is shown in Fig. 5. Instead of employing a mass 14 pivoted about a vertical axis on ring 8 as in Fig. 1, for applying a torque upon tilt in roll, I have shown a mass comprising a weighted rod 50 slidably mounted horizontally within brackets 51 on ring 8 preferably by means of anti-friction bearings. Said rod is provided with an annular rack 52 meshing with a gear sector 53 pivoted on vertical pivot 15' in ring 8. Said gear sector is provided as before with a long curved arm 16' which is coupled to transmit any torque exerted by the mass on the sector 53 to the horizontal lateral axis 4—4' of gimbal ring 2. This coupling is also somewhat different from Fig. 1 in that gearing is used between the arm and the trunnion 4, being shown as a slightly bevelled gear 54 on the end of arm 16 which meshes with bevel gear 55 secured to the trunnion 4 of ring 2. Thus, any tilt of the ring 8 in its plane, i. e., about fore-and-aft axis 6, will tilt the slidably mounted mass from its horizontal position so that it will exert a torque about the roll axis, on the gyroscope as in Fig. 1.

This arrangement possesses the advantage that fore-and-aft accelerations have no disturbing effect on the mass 50 since they are at right angles to the axis of rod 50. Also, mathematical analysis will show that the gearing arrangement of this modification has a slight trigonometric advantage over the pin and fork connection of Fig. 1.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyroscopic artificial horizon indicator for aircraft, including a follow-up gimbal ring pivoted about a roll axis on the craft, and a follow-up inner ring pivoted about a pitch axis within said gimbal ring, means for maintaining the former stabilized about said roll axis and for maintaining the latter stabilized about said pitch axis, a pair of complementary semi-circular discs pivoted on said gimbal ring whereby said discs are stabilized against rolling, the upper disc being of a light color and the lower disc of a darker color, a third circular disc mounted behind said semi-circular discs on said gimbal ring and having its upper half dark and its lower half light, means for moving the lower semi-circular disc downwardly upon climbing of the craft and means for moving the upper disc upwardly upon diving of the craft.

2. A gyroscopic artificial horizon for aircraft, as claimed in claim 1, having an angular roll indicator pointer secured to said gimbal ring and a fixed circular scale on said indicator on which said pointer is readable.

3. In a gyro-horizon for craft, a universally mounted gyroscope, a universal follow-up element within which said gyroscope is universally mounted, a pair of gravity responsive means on said element responsive to tilt of the element about the craft's pitch and roll axes, the latter means comprising a mass free to slide laterally from its normal horizontal position upon tilt of said element in roll, but unresponsive to fore-and-aft acceleration forces, and mechanism for transferring the force exerted by said mass upon tilt to the pitch axis of said gyroscope, whereby the gyroscope is erected.

4. In a gyro-horizon for craft, a universally mounted gyroscope, a universal follow-up element within which said gyroscope is universally mounted, a mass slidably mounted in a transverse normally horizontal plane on said element, whereby it will exert a force upon tilt of said element in roll, but is unresponsive to fore and aft acceleration forces, and mechanism for transferring the force exerted by said mass upon tilt to the pitch axis of said gyroscope, whereby the gyroscope is erected.

5. In a gyro-horizon for craft, a universally mounted gyroscope, a gravitationally responsive device for erecting the gyroscope, a pivoted follow-up member on which said device is mounted, means for imparting a relative tilt between said member and gyroscope, whereby the position in which the device erects the gyroscope may be varied to cause a predetermined slight inclination thereof to the vertical, means for measuring, and producing a signal proportional to, the air speed of the craft, a cosine resolver positioned by the gyro about its pitch axis for modifying said signal to produce a modified signal proportional to the horizontal component but rejecting the vertical component thereof, and means for proportioning the relative tilt so imparted to the gyroscope by said modified signal.

6. In a gyro-horizon for craft, a universally mounted gyroscope, a universal follow-up mounting for said gyroscope, a servomotor for moving said mounting about its fore and aft axis, a second servomotor for moving said mounting about its lateral axis, two-part controllers for controlling each of said servomotors, one part of each controller being mounted on said gyro and the second part on said mounting, pendulous elements pivoted on said mounting for exerting erecting torques on the gyro upon tilt of said mounting, said torques being normal to said tilt, means for introducing a variable factor between the follow-up controller and its servomotor about the pitch axis of the craft causing relative tilt of said mounting and the gyroscope, means for producing a signal proportional to the air speed of the craft, a cosine resolver positioned by the gyro about its pitch axis for modifying said signal to produce a modified signal proportional to the horizontal component only of said air speed, and means for proportioning the relative tilt so imparted to the gyroscope by said modified signal.

7. In a gyro-horizon for craft, a universally mounted gyroscope, a universal follow-up mounting for said gyroscope, both having fore and aft and transverse trunnions normally aligned with each other, a pendulous bell-crank element pivoted on said mounting slightly to one side of the transverse axis of the mounting and gyroscope, said element having a pin thereon adjacent the end of said bell-crank on the other side of said axis, said pin engaging a normally horizontal trackway on said gyroscope, whereby upon relative tilt of said pendulum and gyroscope, a torque is exerted thereon about an axis at right angles to the tilt and said torque is varied upon change in the inclination of said follow-up mounting, means for introducing a variable signal between the follow-up controller and its servomotor acting about the pitch axis of the craft causing relative tilt of said mounting and said gyroscope, and means for varying said signal with speed of the craft.

8. In a gyro-horizon for craft, a universally mounted gyroscope, a universal follow-up mounting for said gyroscope, a servomotor for moving said mounting about its fore and aft axis, a second servomotor for moving said mounting about its lateral axis, a two-part controller for controlling each of said servomotors, one part of each being mounted on said gyro and the second part on said mounting, gravitationally responsive elements movably mounted on said mounting for exerting erecting torques on the gyro upon tilt of said mounting, said torques being normal to said tilt, means for introducing a variable factor between the follow-up controller and its servomotor about the pitch axis of the craft causing a slight relative tilt of said mounting and the gyroscope, means for producing a signal proportional to the air speed of the craft, a cosine resolver positioned by the gyro about its pitch axis for modifying said signal to produce a modified signal proportional to the horizontal component but rejecting the vertical component thereof, and means for proportioning the relative tilt so imparted to the gyroscope by said modified signal.

9. In a gyroscopic horizon for aircraft, a universal mounting for said gyro-vertical, a universally mounted follow-up support for said gyro-vertical, both said mounting and support having fore and aft and transverse pairs of trunnions normally aligned with each other, a bell crank element pivoted on said follow-up mounting on a normally vertical axis substantially aligned with the spin axis of said gyro-vertical, one arm of said element being eccentrically weighted to one side of said vertical axis, the other arm of said element having a pin and slot connection adjacent a horizontal axis of said gyro-vertical so as to exert a torque on said gyro upon relative tilt of said follow-up support and said gyro about one of said pairs of trunnions, said torque being exerted about the other of said pair of gyro-trunnions.

References Cited in the file of this patent

UNITED STATES PATENTS

| | | |
|---|---|---|
| 1,736,039 | Gray | Nov. 19, 1929 |
| 2,410,058 | Frische et al. | Oct. 29, 1946 |
| 2,411,087 | Ford et al. | Nov. 12, 1946 |
| 2,620,669 | Braddon | Dec. 9, 1952 |

FOREIGN PATENTS

| | | |
|---|---|---|
| 584,147 | Great Britain | Jan. 8, 1947 |